Dec. 18, 1956     W. SCHRAUB     2,774,260
HORIZONTAL BORING MACHINE WITH COLUMNAR GUIDES
Filed Feb. 16, 1954     2 Sheets-Sheet 1
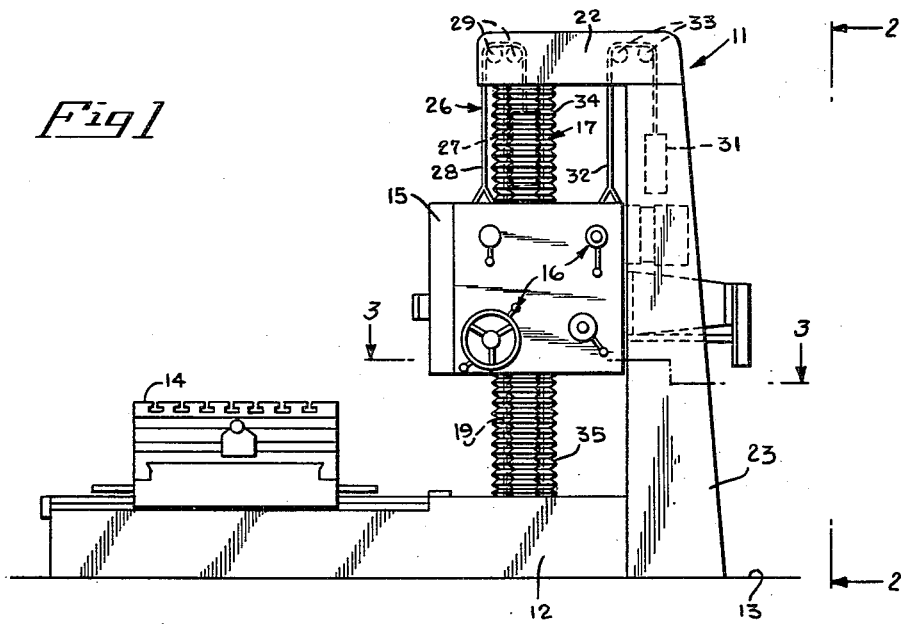
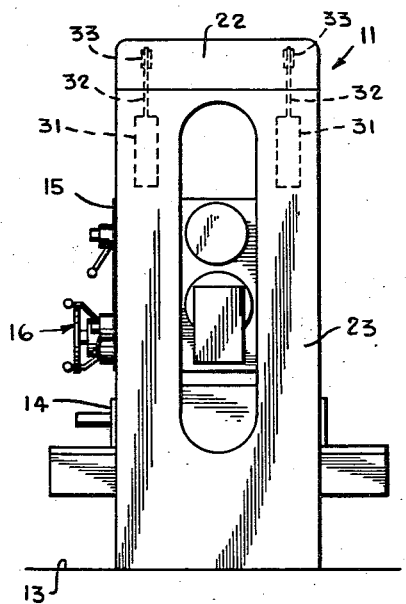
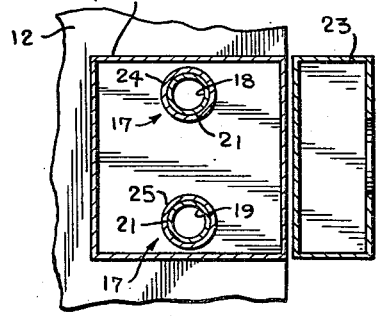
*INVENTOR:*
WILLI SCHRAUB,
BY
*HIS AGENTS.*

Dec. 18, 1956  W. SCHRAUB  2,774,260
HORIZONTAL BORING MACHINE WITH COLUMNAR GUIDES
Filed Feb. 16, 1954  2 Sheets-Sheet 2

INVENTOR:
WILLI SCHRAUB,
BY
HIS AGENTS.

United States Patent Office 2,774,260
Patented Dec. 18, 1956

2,774,260
HORIZONTAL BORING MACHINE WITH COLUMNAR GUIDES

Willi Schraub, Wickrath (Niers), Germany, assignor to Scharmann & Co., G. m. b. H., a company with limited liabilities Application February 16, 1954, Serial No. 410,477

Claims priority, application Germany February 25, 1953

4 Claims. (Cl. 77—3)

The invention relates to boring machines, and relates more particularly to horizontal boring machines with a vertically movable spindle box.

Reference is made to my copending application Serial No. 410,476, filed February 16, 1954, now Patent No. 2,699,695, dated January 18, 1955.

Desirable features for horizontal boring machines include accurate and reliable vertical guiding of the spindle box, and these are generally found in boring machines now in use. However, present guides for horizontal boring machines are usually made of heavy castings either with flat or V-shaped plane guiding surfaces. These guides are characterized by heavy weight, and high cost of material and labor required for the necessary extremely accurate flat machining of the guiding surfaces.

It is therefore among the principle objects of the instant invention to provide a horizontal boring machine that has guiding means for the spindle box that are lighter in weight and can be manufactured at greatly reduced cost.

Generally speaking, this is accomplished by the use of hollow guiding columns with round external guiding surfaces.

Further objects and advantages of the invention will be set forth in part in the following specification and in part will be obvious therefrom without being specifically referred to, the same being realized and attained as pointed out in the claims hereof.

The foregoing and other objects of the invention will be best understood from the following description of exemplifications thereof, reference being had to the accompanying drawings, wherein:

Fig. 1 is a side elevational view, of a horizontal boring machine in accordance with one embodiment of the invention;

Fig. 2 is a rear elevational view, seen in direction 2—2 of Fig. 1;

Fig. 3 is a fragmentary sectional view taken on line 3—3 of Fig. 1; and

Figure 4:
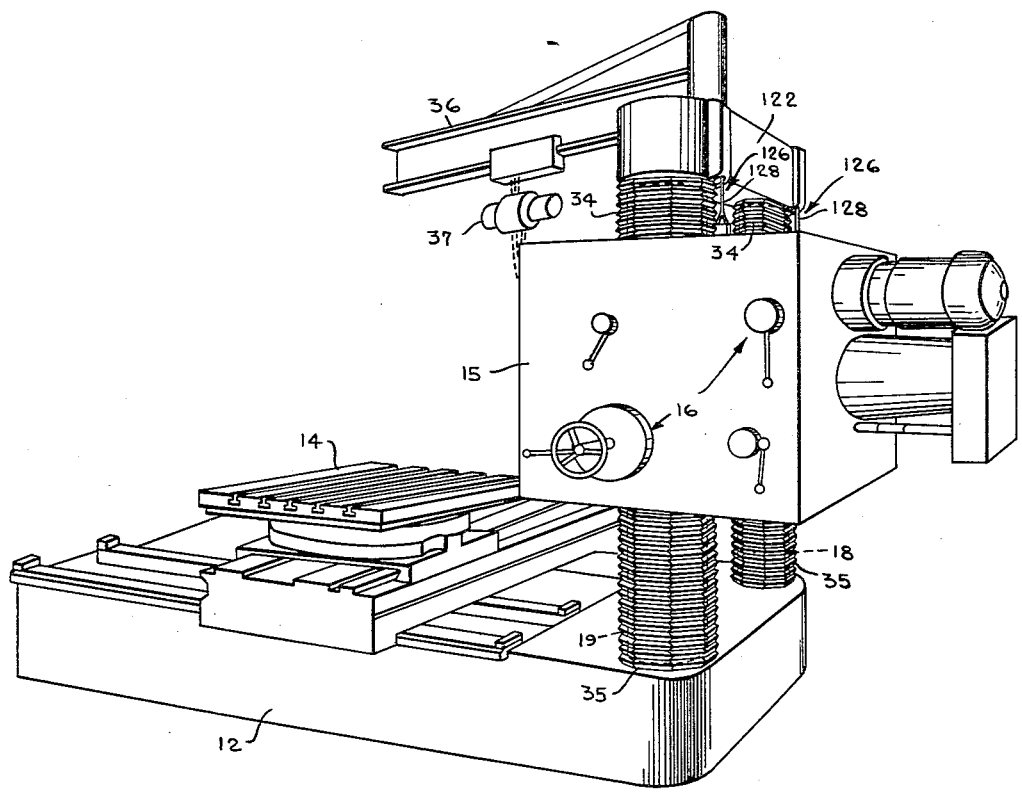
Fig. 4 is a perspective view, illustrating a modification.

In carrying the invention into effect in the embodiments which have been selected for illustration in the accompanying drawings and for description in this specification, and referring now particularly to Figs. 1–3, there is provided a horizontal boring machine generally indicated at 11. The machine 11 comprises a bed 12 that may be directly laid on the floor 13. A worktable 14 for a workpiece (not shown) is movably disposed on the bed 12.

Above the bed 12 and near the support 14, there is vertically movably disposed a spindle box 15. Suitable means (not shown), well-known to the skilled artisan may be provided for moving the spindle box 15 up and down, and means generally indicated at 16 are provided on the spindle box 15 for the usual tool operation.

Guiding means are provided, generally designated 17, for guiding the spindle box 15 in all positions and throughout its vertical movement between all positions. These means 17 include two vertical columns 18 and 19, the lower portions of which are supported by the bed 12. The external surfaces 21 of the columns 18 and 19 are machined round, for instance cylindrically.

An interconnecting means, such as a crossbar 22 is secured to the top portions of the columns 18 and 19 completing with the columns and the bed a closed framework system. A support 23 may be provided near one end of the bed 12, the top portion of which may be connected to the crossbar 22 for augmenting the stability of the framework system.

As best shown in Fig. 3, the box 15 surrounds both columns 18 and 19, and comprises sliding engaging means, such as for instance cylindrical sliding elements 24 and 25; the elements 24 and 25 slidingly engage the guiding surfaces 21 of the columns 18 and 19.

In order to counterbalance the weight of the spindle box 15, there may be provided a counterbalancing mechanism, generally designated 26. It comprises two counterweights 27, and flexible connecting means such as chains or bands 28, each band extending between a weight 27 and the top of the box 15. The bands 28 are suspended on rollers 29 that are journaled in the crossbar 22.

In accordance with the invention, the columns 18 and 19 may be made of tubular shape, hollow on the inside, so that each weight 27 may be disposed on the interior of one of the columns 18 and 19. The counterbalance mechanism 26 furthermore includes additional weights 31 that are guided by means of bands 32 and are suspended on rollers 33 and also connected to the top of box 15. The support 23 may be made hollow and the weights 31 may be disposed on the interior of the support 23.

In order to protect from becoming soiled those portions of the guiding surfaces 21 of the columns 18 and 19 that are exposed by the box 15, there are provided protective means such as upper and lower bellows 35 and 34, respectively. Each of the columns 18 and 19 has an upper bellows 34 and a lower bellows 35. The upper bellows 34 are secured to the underside of the crossbar 22 and to the top of the box 15 and, conversely, the lower bellows 35 are secured to the underside of the box 15 and to the top of the bed 12. Each of the said bellows is expandable so that the said exposed portions of the guiding surface 21 will be protected by said bellows in all positions of said spindle box 15.

The operation of the aforedescribed embodiment is as follows:

The spindle box 15 may be displaced vertically in the usual manner by well-known suitable means (not shown) into all working positions. The weight of said box 15 will be counterbalanced in all positions by the weights 27 (and 31). During such displacement, the elements 24 and 25 will slide on the sliding surfaces 21 of the columns 18 and 19, thereby guiding the box 15. During such displacement, the weights 27 (and 31) will make corresponding movements, the weights 27 on the interior of the columns 18 and 19 (and the weights 31 on the interior of the support 23). The portions of the sliding surface 21 that are not covered, and are thus exposed, by the box 15 are protected in all positions of the box 15 by the expandable bellows 34 and 35.

In the modification shown in Fig. 4, the crossbar 122 extends only between the columns 18 and 19. In this modification, the support 23 has been omitted, and the counterbalancing mechanism 126 includes only one pair of weights (not shown) disposed on the interior of the columns 18 and 19 and only two bands 128.

On the crossbar 122, there may be appended a lifting mechanism, such as a crane 36 that includes a hoist 37 for moving the workpiece to and from the worktable 14.

In all other respects the modification shown in Fig. 4 is like that of Figs. 1–3.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described herein.

Having thus described the invention, what I claim as new and desire to be secured by Letters Patent, is as follows:

1. In a horizontal boring machine, having a bed and a spindle box vertically movable in opposite directions above said bed, in combination, two vertical columns supported on said bed guiding said spindle box vertically, an upright support adjacent said columns connected to said bed, a cross piece interconnecting the top of both columns and of the support to stabilize said columns, and means connected to said cross piece and operable for raising and lowering said spindle box.

2. In a horizontal boring machine, as claimed in claim 1, together with, each column having a cylindrical guiding surface for the guiding of said spindle, and bellows surrounding each column above and below said spindle box and being expandable for protecting the exposed portions of said guiding surfaces in all positions of said box.

3. In a horizontal boring machine, as claimed in claim 1, said raising and lowering means including counter weights concealed internally of said columns and internally of said support.

4. In a horizontal boring machine, as claimed in claim 1, said support having midway between its lateral sides a vertical passage, said spindle box including an extension projecting through said slot for manual access to said extension away from said bed in all positions of the spindle box.

References Cited in the file of this patent

UNITED STATES PATENTS

| | | |
|---|---|---|
| 240,458 | Putnam | Apr. 19, 1881 |
| 504,031 | Gordon | Aug. 29, 1893 |
| 1,646,892 | Williams | Oct. 25, 1927 |
| 1,981,682 | Volger | Nov. 20, 1934 |
| 2,370,384 | Williamson | Feb. 27, 1945 |
| 2,529,753 | Williams | Nov. 14, 1950 |
| 2,564,068 | Kearns | Aug. 14, 1951 |
| 2,640,376 | Johnson | June 2, 1953 |

FOREIGN PATENTS

| | | |
|---|---|---|
| 683,417 | Great Britain | Nov. 26, 1952 |